Aug. 6, 1940.  P. ZALKIND  2,210,019
THREE SIDED CASING
Filed Oct. 19, 1935  7 Sheets-Sheet 2
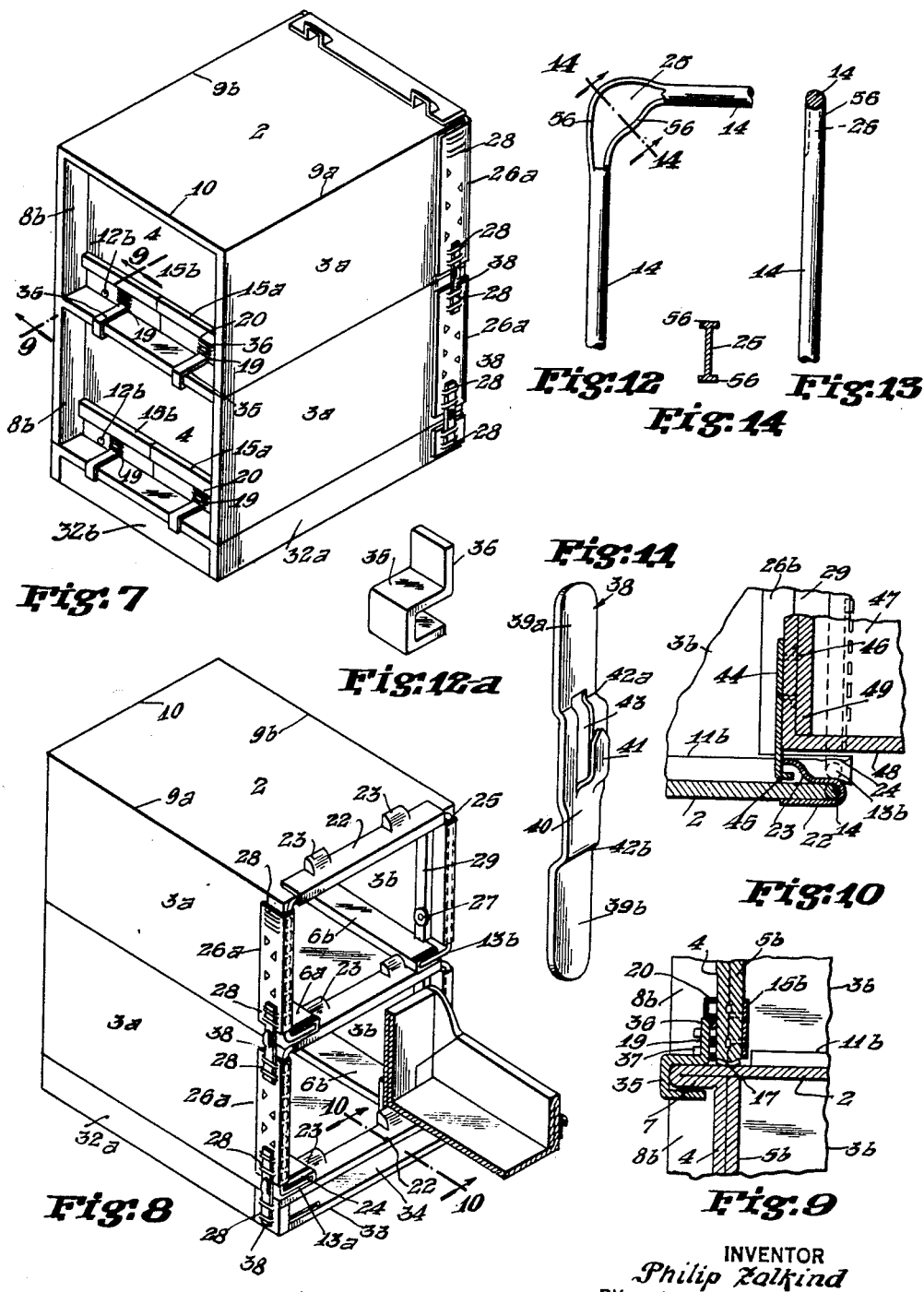
INVENTOR
Philip Zalkind
BY
Samuel Ostrolenk
ATTORNEY

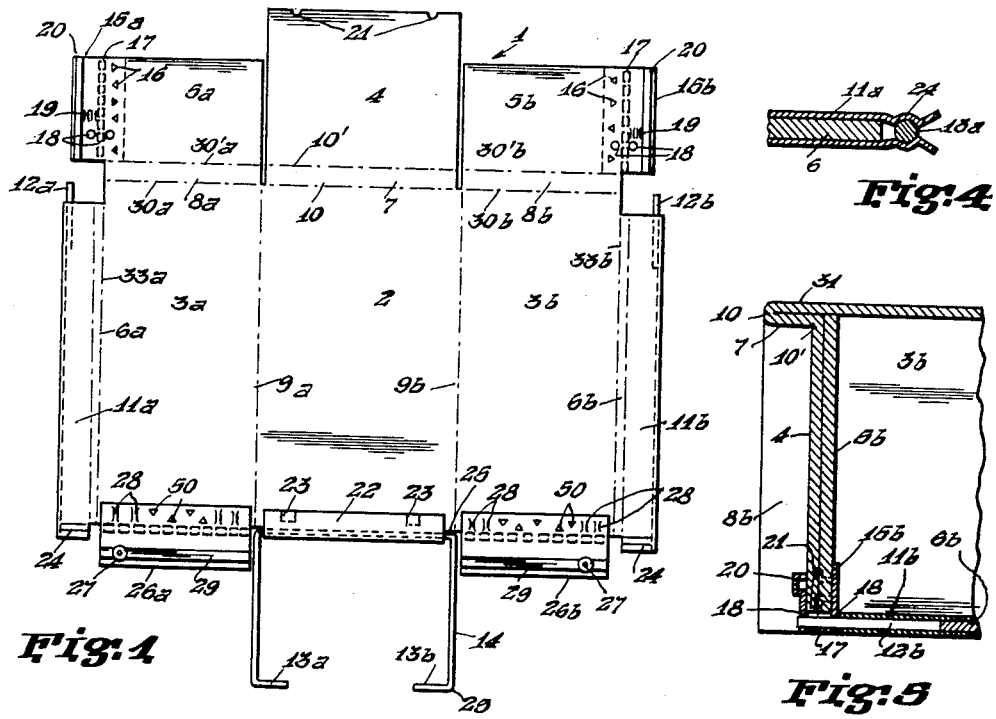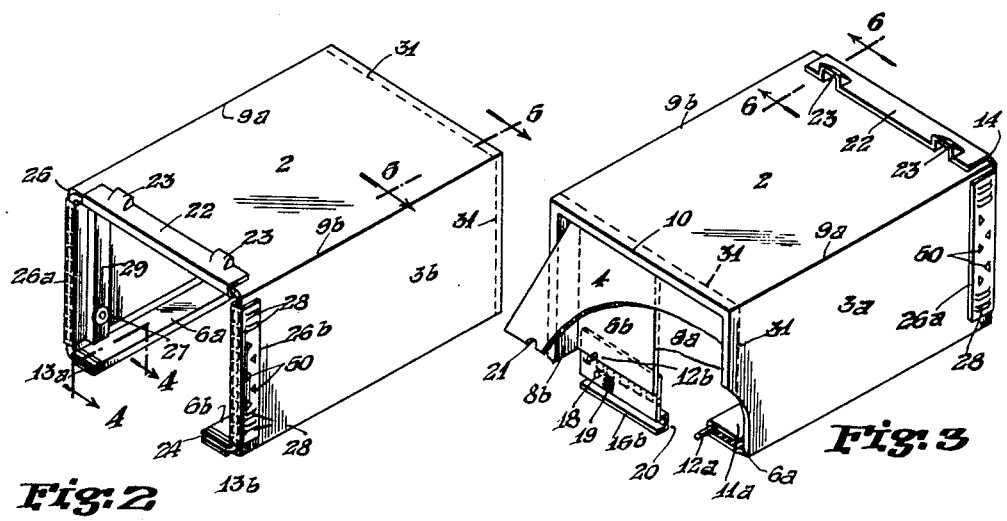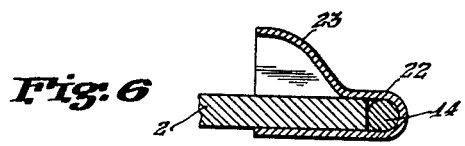

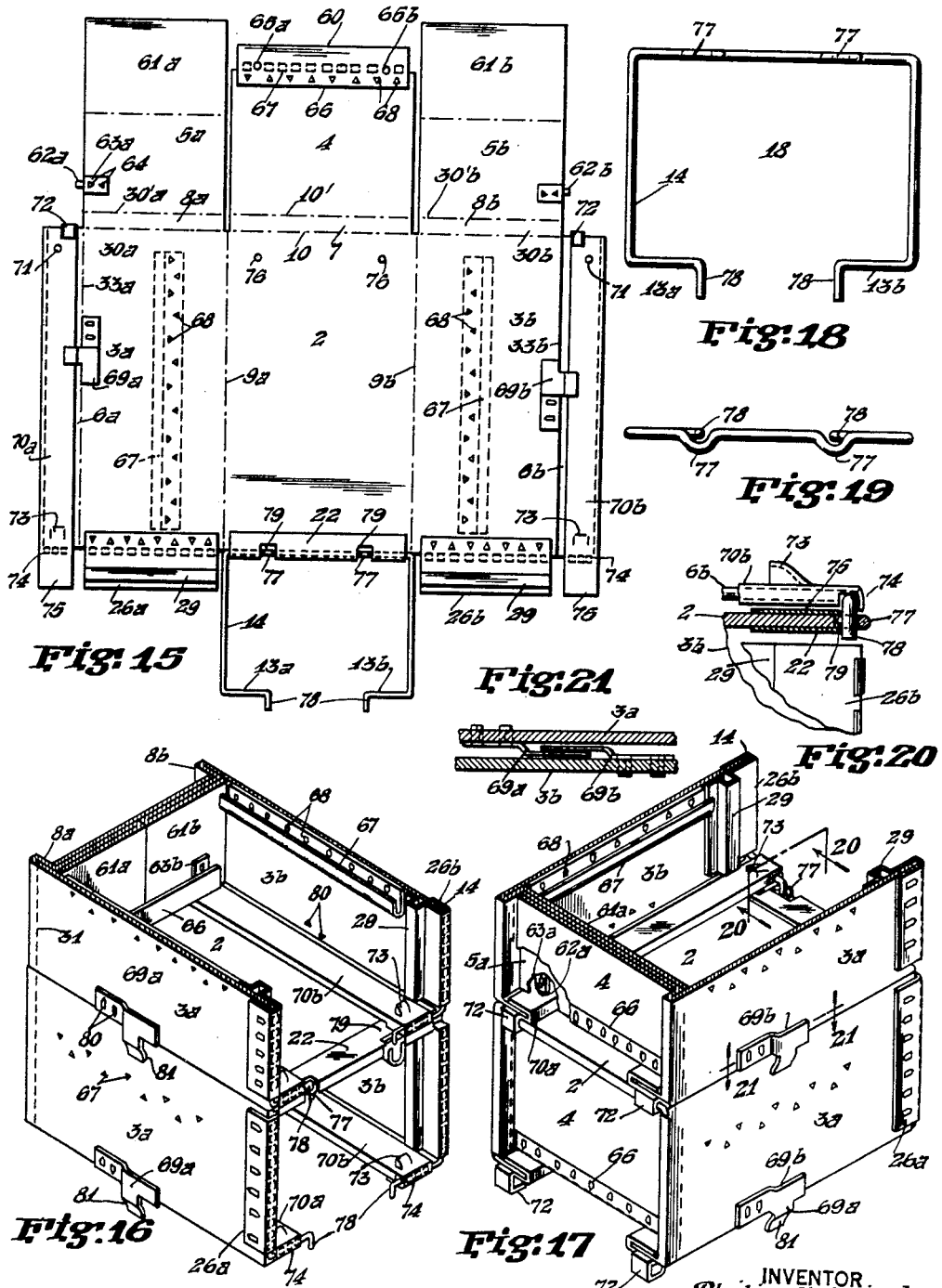

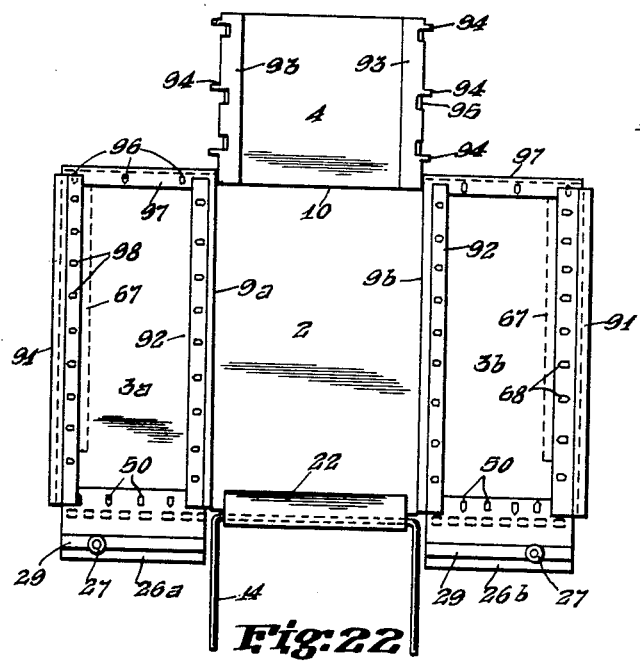

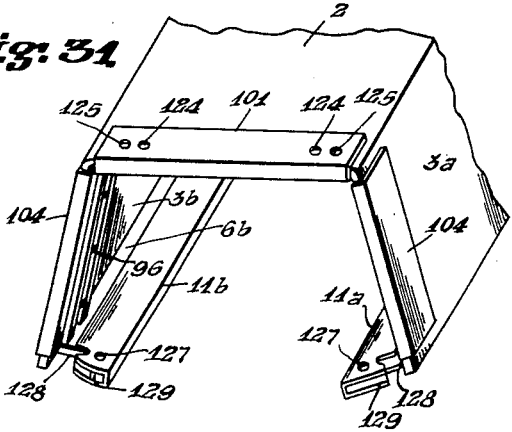
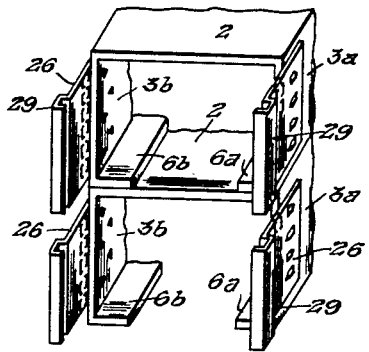
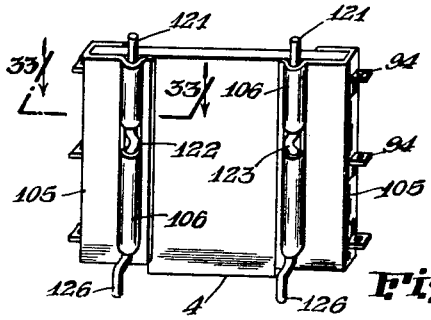
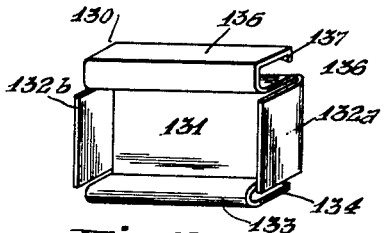
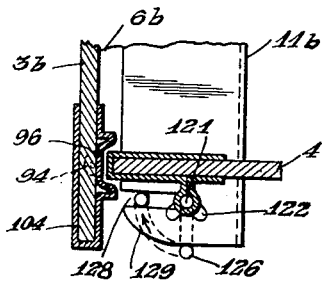
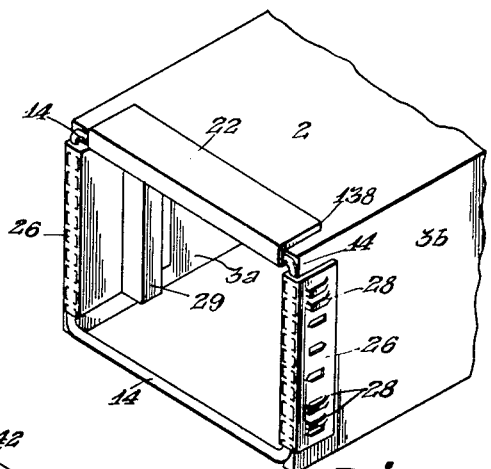
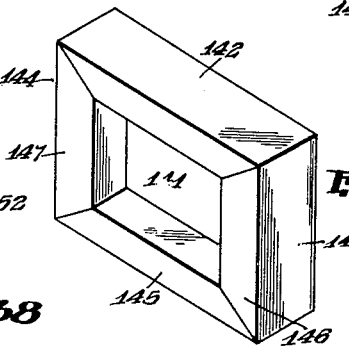

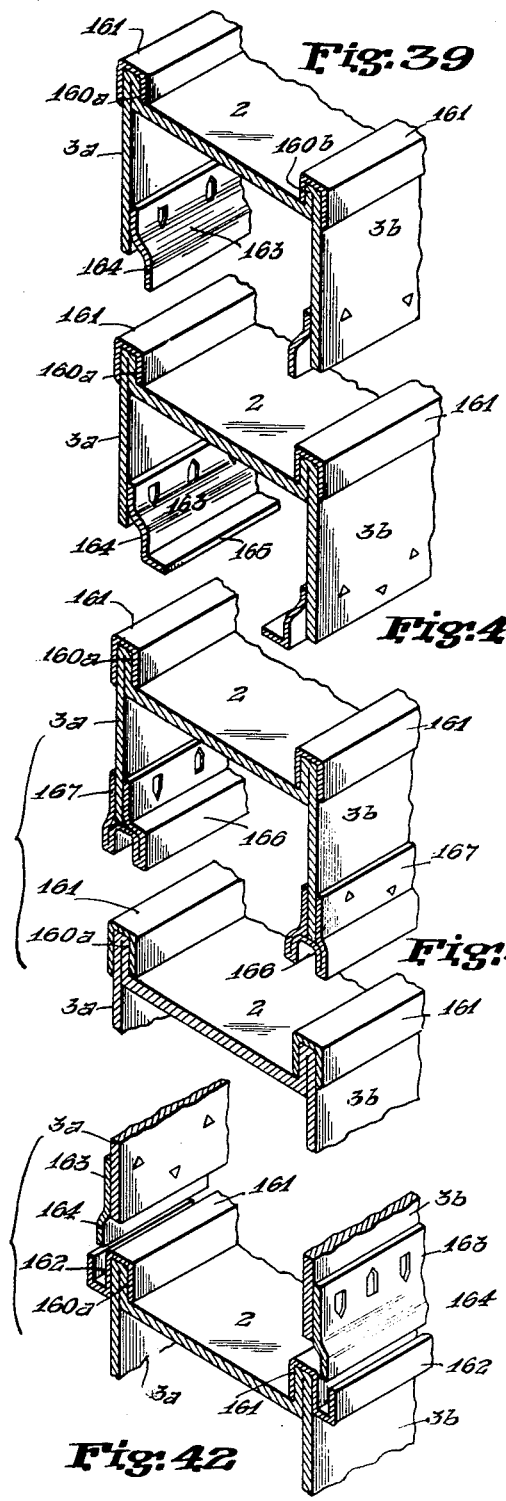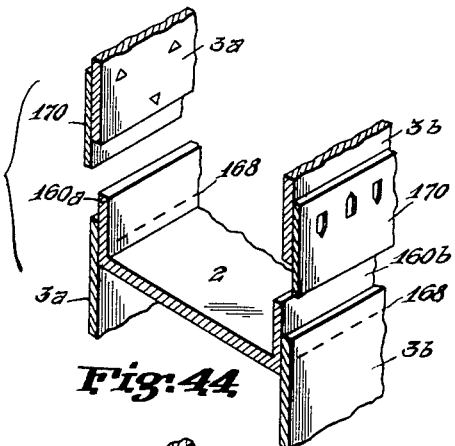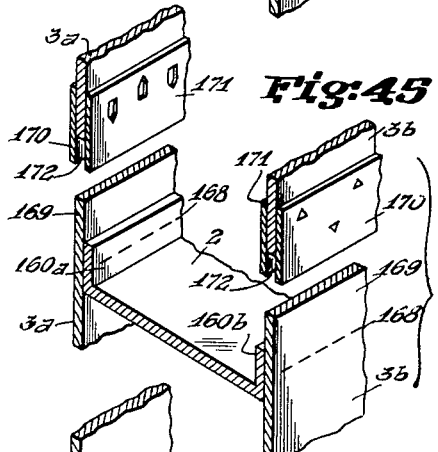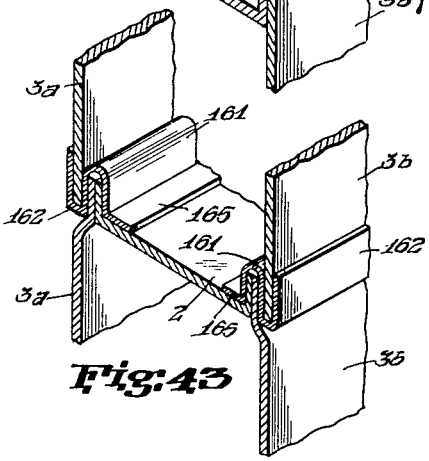

Aug. 6, 1940.  P. ZALKIND  2,210,019
THREE SIDED CASING
Filed Oct. 19, 1935  7 Sheets-Sheet 7

INVENTOR
Philip Zalkind
BY Samuel Ostrolenk
ATTORNEY

UNITED STATES PATENT OFFICE 2,210,019

THREE SIDED CASING

Philip Zalkind, New York, N. Y.

Application October 19, 1935, Serial No. 45,714

8 Claims. (Cl. 312—108)

My invention relates to containers, and more particularly relates to collapsible casings for filing drawers and the like.

In my co-pending applications Serial No. 690,360 filed Sept. 21, 1933, now Patent No. 2,118,011, and S. N. 693,841 filed October 16, 1933, of which this application is a continuation in part, reinforcing members, preferably made of metal are applied to open front end of a container comprising a bottom member, a top member, and two side walls, the reinforcing members being so applied to the container that it may readily be collapsed for shipment with the reinforcing members applied to the casing. In these co-pending applications, I also showed means of interlocking superposed and adjacent casings.

I have found that by a novel construction, I can produce a casing comprising two sides and either a top member or a bottom member and thus secure a considerable economy in the construction and at the same time the casing will have great structural strength and rigidity.

In this construction, I use sheet material having score or bend lines on which said material may be manually folded so that the container may be folded or collapsed for shipment, and this collapsibility is secured with the reinforcing members applied to the casing and preferably with interlocking means between superposed casings.

I have found that when superposed casings of a stack are suitably interlocked, such interlocking may be arranged in a manner that each of the casings of the stack impart additional strength to each other. Thus where in my novel construction I use a casing comprising a top wall and two side walls, and with such novel construction, I place the casing over a similar casing and suitably interlock the two casings together, the top of the subjacent casing acts as a bottom member for the upper casing and the interlocking means may be utilized to assist in maintaining the bottom width of the upper casing to an amount substantially equal to that of the top width of the casings.

While in the construction of my novel casing, I may use any suitable material such as corrugated board, paper board or other sheet material of fibrous nature, I prefer to use a laminated material comprising a metallic layer combined with a dominant non-metallic layer having a score or bending line on which the laminated structure is manually foldable. Such a sheet is described and claimed in my copending application Serial No. 21,411, filed May 14, 1935.

In addition to the advantage accruing to my novel construction through economy of material, certain other advantageous features may be secured as will later be described in further detail. Thus, with a casing comprising a top member and two side members, track members may be applied either directly to the side members or to the flaps attached to the side members. In this manner, the tracks are at or near the edges of the casing blank and thus may be more easily applied to the blank than in a form of casing wherein the track must be positioned at some distances from the edge of the casing blank. This is of particular advantage in handling blanks of large size such as are needed to produce casings suitable for use with filing drawers for letter size or legal size sheets.

Moreover, in my novel construction where the casing is used to house a drawer such as a filing drawer, said drawer fits between parts of two casings and where a stop is provided to prevent the drawer being accidently withdrawn from the casing, such stop may be a part of either of the casings; and I find that I may advantageously provide such drawer stop either attached to the upper portion of the lower casing or lower portion of the upper casing between which the drawer is positioned.

Accordingly, objects of my invention are to provide a folding or collapsible casing comprising side walls with either a top or bottom wall and provided with reinforcing members which serve to maintain the casing in proper position when the casing has been folded into set up position. Other objects of my invention are to provide interlocking means for adjacent and/or superimposed sections which cooperate in maintaining the casing in proper position in its set up position and which contribute to the strength and rigidity of the casings of a stack. Further objects are to provide drawer suspension means, drawer stops, and other novel features in a collapsible casing having three principal sides.

In the construction of my novel casing, I may utilize many of the novel features disclosed in my copending applications filed coincidentally with this application and entitled Clips, Serial No. 45,712, now Patent No. 2,142,166; Predetermined bend line, Serial No. 45,710; Rollers, Serial No. 45,715; Reentrant clips, Serial No. 45,709; Panels, Serial No. 45,708, now Patent No. 2,144,646; Container fastening means, Serial No. 46,316.

There are other objects of my invention, which together with the foregoing, will appear in the detailed description following in connection with the drawings, in which:

Figure 1 shows a developed blank which may be folded into one form of my casing.

Figure 2 is a perspective view showing a casing formed from the blank of Figure 1 as viewed from the front end of the casing.

Figure 3 is a perspective view showing the casing of Figure 1 as viewed from the rear end.

Figure 4 is an enlarged sectional view on the plane 4—4 of Figure 2 showing a means for maintaining the front end of the side wall extensions in proper position relative to the casing.

Figure 5 is an enlarged sectional view on the plane 5—5 of Figure 2 showing the construction of the rear end of the casing and means for maintaining the rear end of the side wall extensions in proper position relative to the casing.

Figure 6 is an enlarged sectional view on the plane 6—6 of Figure 3 showing a method of forming a drawer stop in the top horizontal front end reinforcing member of the casing.

Figure 6A is a sectional view showing one form of laminated sheet formed of layers of metallic and non-metallic sheets.

Figure 7 is a perspective view of the rear end of a stack of two casings made from the blank of Figure 1, mounted on a suitable base section, and interlocked.

Figure 8 is a perspective view similar to Figure 7 but showing the front end of the stack with a drawer partly broken away (with a drawer stop) in place in one of the casings.

Figure 9 is an enlarged section on the plane 9—9 of Figure 7 showing means for interlocking the rear end of superposed sections.

Figure 10 is a fragmentary vertical section view on line 10—10 of Figure 8.

Figure 11 is a perspective view showing the details of a front interlocking member such as is shown in place in Figures 7 and 8.

Figure 12 is an enlarged front elevation showing a method of strengthening the corners of the tie member for reinforcing the end of the casing.

Figure 12a is a perspective view showing the details of a rear interlocking member such as is shown in place in Figures 7 and 9.

Figure 13 is a side elevation of Figure 12.

Figure 14 is a cross sectional view on the line 14—14 of Figure 12.

Figure 15 shows a developed blank which may be folded into a modified form of my casing.

Figure 16 is a perspective view as seen from the front end showing two casings (one partly broken away) as may be formed from the blank shown in Figure 15.

Figure 17 is a perspective view similar to Figure 16, but showing the casings as viewed from the rear end.

Figure 18 is a front elevation showing the tie member for reinforcing the front end of the casing.

Figure 19 is a plan view of Figure 18.

Figure 20 is an enlarged section on the plane 20—20 of Figure 17 showing how the tie member shown in Figures 18 and 19 may also be used as means for interlocking superposed casings.

Figure 21 is an enlarged section on plane 21—21 of Figure 17 showing side interlocking means for superposed and adjacent casings.

Figure 22 is a developed blank which may be folded into a further modified form of my casing.

Figure 23 is a perspective view as seen from the front end showing two casings (one partly broken away) as may be formed from the blank shown in Figure 22. A drawer portion is shown inserted in one of the casings.

Figure 24 is an enlarged sectional view on the plane 24—24 of Figure 23 showing a stop member on the drawer coacting with a rabbet on the vertical front reinforcing member to prevent accidental withdrawal of the drawer.

Figure 25 is a perspective view showing a modified form of rear end construction for my casing.

Figure 26 shows in elevation a form of rear end panel for use with the form of rear end shown in Figure 25.

Figure 27 is a cross section on the line 27—27 of Figure 26 showing the panel of Figure 26 in place in the casing tubing of Figure 25.

Figure 28 shows in elevation the rear end of a casing as constructed in Figures 25, 26 and 27 interlocked with a subjacent similar casing.

Figure 29 shows an enlarged cross section of a pin used for fastening the panel of Figure 26 within the tubing of Figure 25 to form an end wall therefor.

Figure 30 shows an interlocking strap for interlocking the rear end of adjacent casings formed with a rear end as shown in Figures 25 to 29 inclusive.

Figure 31 shows in perspective a further modified form of rear end construction for my casing.

Figure 32 is a perspective view showing a rear end panel suitable for use with the rear end construction shown in Figure 31.

Figure 33 is an enlarged sectional view on the plane 33—33 of Figure 32 with the rear end panel of Figure 32 assembled with the rear end structure of Figure 31.

Figure 34 is a perspective view of the rear end of two casings in a stack with a further modified form of rear end structure.

Figure 35 is a perspective view of a further modified form of rear end for my casing.

Figure 36 is a perspective view of a rear end panel which may be used for a rear end closure with the rear end construction shown in either Figure 34 or 35.

Figure 37 is a perspective view of a plug type panel which may be used as a closure with the rear end section shown in Fig. 35.

Figure 38 is a perspective view of a leg, four of which may be used in lieu of a base for a single casing or a stack of casings.

Figures 39 to 45 inclusive are isometric views showing my casing with the top panel inset between the side walls and with various modifications of interlocking means for superposed casings.

Figure 46:
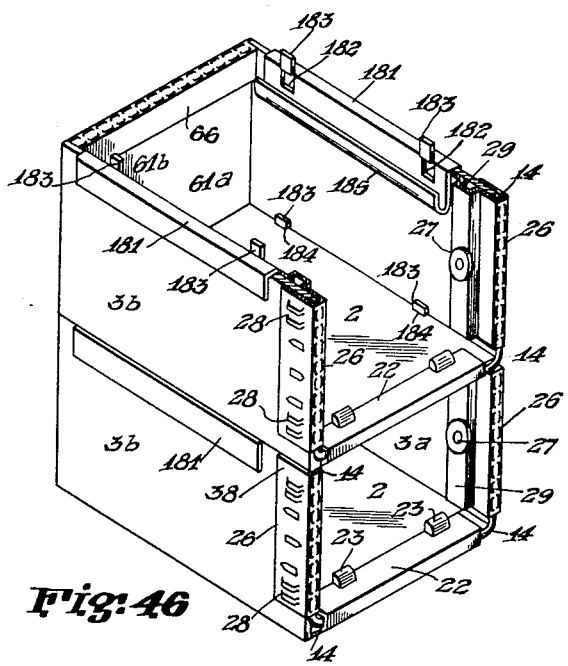

Figure 46 is an isometric view of two casings stacked one on the other and formed with two side walls and a bottom wall.

Figure 47:
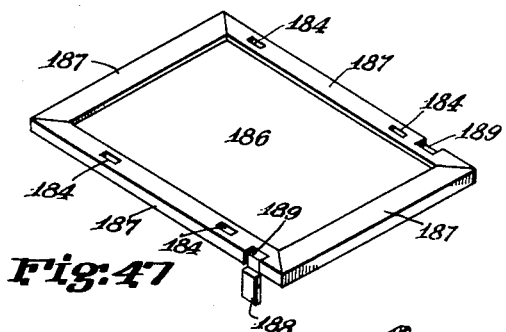

Figure 47 is an isometric view of a top panel which may be used with a casing such as is shown in Figure 46.

Figure 48:
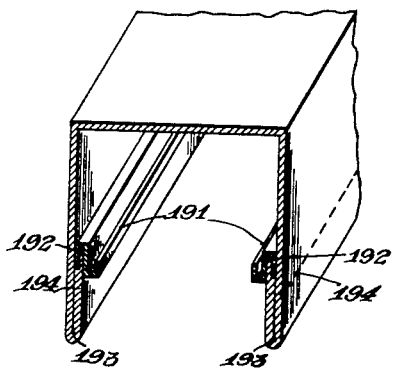
Figure 49:
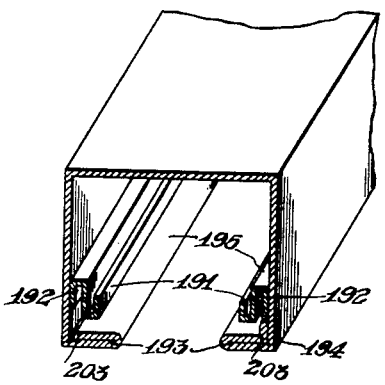
Figure 50:
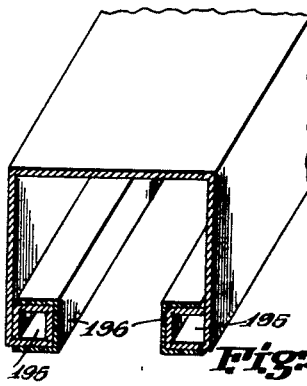

Figures 48 to 50 are isometric views showing portions of casings with various forms of track members which may be used with my casing.

Figures 51 to 54 are isometric views showing sections of other modified forms of track members.

Referring now to Figure 1, the blank 1 comprises a top panel 2, side wall panels 3a and 3b, back panel 4, side wall extensions 5a and 5b forming back reinforcement, and side wall extensions 6a and 6b forming bottom reinforcements. The top panel 2 is joined to the back panel 4 through the short panel 7. Similarly, panel 5a is joined to the panel 3a through the panel 8a; and the panel 5b is joined to the panel 3b through the panel 8b. The boundaries of the various panels are defined by suitable score or bending lines along which the material may be manually folded; as for instance, the bend line 9a defines the boundary between the top panel 2 and the side wall 3a, the bend line 9b defines the boundary between the top panel 2 and the side panel 3b, and the bend line 10 defines the boundary between the top panel 2 and the connecting panel 7.

The blank may be of any suitable sheet material, such as corrugated board. I prefer that the blank be formed from one of the various forms of laminated sheet which I have disclosed in my copending application Serial No. 21,411 dated May 14, 1935. Thus the blank may be formed from a sheet of corrugated board in laminar union with a sheet of thin metal, the score or bending lines being applied to the layer of corrugated board in such a manner that the combined sheet is manually bendable on the score line. The metallic layer as viewed in Figure 1 forms the top surface of the sheet. In this manner, when the blank is bent up to form a casing, the entire casing will be protected by a continuous metallic surface.

In Figure 6a I have shown a laminated sheet comprising a layer of corrugated board A, a layer of asbestos paper B and B' on either side thereof, and a layer of sheet metal C and C' on the outer surfaces of the laminated sheet. The sheet metal is preferably of steel of a thickness between 26 gauge and 38 gauge, but other metal may be used. The score line D in the layer of corrugated board A, predetermines the line along which the composite, laminated sheet may be manually folded or bent. The several laminations may be united with each other in any suitable manner. Also certain of the laminations may be omitted. Thus the laminated sheet may be constructed with only the corrugated board A (having the score line D) combined directly to a metal sheet as C.

The side flaps 6a and 6b may be provided with the metallic channels 11a and 11b respectively. These channels may be clinched or otherwise fastened to the said flaps, and serve not only to reinforce the flaps but also may act as tracks for wheels which may be mounted on the bottom of a drawer which may be inserted in the casing formed when the blank is folded into set-up position. Such form of drawer is shown in my copending application entitled End fold casing, Serial No. 45,713 now Patent No. 2,088,315, and filed coincidentally with this application.

At the rear end of the flaps 6a and 6b and held in place by the channel members 11a and 11b, with a portion of their length projecting beyond the rear end of the flaps are the rods 12a and 12b, the purpose of which will be explained later. The front end of the channels 11a and 11b extend beyond the front ends of the flaps 6a and 6b and are formed into a shape to receive the ends 13a and 13b of the tie wire 14 as clearly shown at 24 in Figure 4.

On the sides of the flaps 5a and 5b, the metallic members 15a and 15b are attached by any suitable means, as for instance, by the prongs 16. The members are preferably applied to the sheet on the far side as viewed in Figure 1, and they protrude beyond the edge of the flaps with the bending line 17 approximately at the edge of the flap. The bending line 17 in the metal members 15a and 15b may be constructed in the manner disclosed in my application entitled Predetermined bend line, Serial No. 45,710, and filed coincidentally with this application. The metallic members 15a and 15b are each provided with two holes 18 one on each side of the bend line 17. These holes are of such size and are so placed that when the casing is folded into position, the rods 12a will enter the holes 18 on member 15a and the rod 12b will enter the holes 18 on the member 15b. Also each of members 15a and 15b is provided with the slots 19 formed by slitting the metal and deforming the material between the slits out of the plane of the member, and with the rabbet 20. Both the slots 19 and the rabbet 20 are shown more clearly in Figure 9.

The end panel 4 is provided with the holes 21, adapted to receive the pins 12a and 12b when the casing is folded into position for use.

At the front end of the top panel, 2, the metallic member 22 is attached by any suitable means as for instance, by clinching, to the sheet material of the blank. This channel member holds the tie wire 14 to the front edge of the top member in a manner whereby the tie member 14 may be rotated about the edge of the casing. The member 22 may be provided with the open cup shaped portions 23 which act as stops for a drawer as will be later described in further detail. These cups 23 which are more clearly shown in Figure 6 may be formed as an integral portion of the channel 22 or they may be separate members attached to the channel 22 in any suitable manner.

The tie member 14 may be a heavy wire bent into the form of a U as shown in Figure 1 with the inwardly projecting portions 13a and 13b. These portions may be of a length substantially equal to the width of flaps 6a and 6b; or if the web of the channels 11a and 11b are cut away in the overhanging portion 24 shown in Figure 4, the inwardly projecting portions 13a and 13b may be extended so that they form a continuous member at the bottom of the casing, such as is shown in connection with the rear end view of Figure 35 to be described more fully later. The wire 14 may have a simple right angle bend at the corners 25, but where an unusually heavy load is to be carried or where a large side casing is to be formed, the corners 25 may be reinforced.

My preferred method of reinforcing is shown in Figures 12, 13 and 14 which shows in three views on an enlarged scale, one of the corners 25. As will be seen in these figures, the wire is pressed out at the corner to form an I shaped section of relatively large depth at the corner where the maximum bending moment may be applied to the tie member. In this way, the tie member will have considerably greater strength against deformation out of proper angular relationship, than would a plain angular bend in the wire. It may be understood that prior to forming the I section, the wire may be upset at the location that the I is to be formed. Also it will be understood that half of the flanges 56 may be omitted to form a channel section instead of an I beam section. Also, the flanges 56 may be omitted entirely, leaving a substantially rectangularly section at the corner. Any of these sections will have a greater resistance to a bend moment tending to change the angularity of the member 14 than would a circular section of equal area. Therefore, any of these forms will reinforce the corner and enable the wire 14 to hold the desired shape.

At the front end of the side wall panels 3a and 3b are the metallic members 26a and 26b. These members may be attached to the panels by any suitable means, as for instance, by the prongs 50. The members 26a and 26b protrude beyond the front edge of the panels 3a and 3b and are provided with a bending line along the front edge of the panels. This bending line is of the type described in my copending application already referred to in describing members 15a and 15b. Members 26a and 26b each are provided with a rabbet 29 on which may be mounted a wheel 27 for cooperating with a track mounted on the drawer. Also formed on the members 26a and 26b are the slots 28, similar in construction to the slots 19 on the members 15a and 15b.

The construction of the reinforcing members around the front open end of the casing in general follows that shown in my copending application S. N. 693,841 of Oct. 16, 1934, so far as this construction is applicable to a casing having no bottom panel, and the method of supporting the drawer within the casing may be one of the forms shown in my copending application entitled Roller casing and hereinbefore referred to.

Prior to shipment the blank may be folded back on the score lines 30a, 10 and 30b. Panel 8a may then be attached to panel 3a by any suitable means. Adhesive may be used for this purpose. Another suitable means is by the use of the stitching 31 shown in Figures 2, 3 and 5. In a similar manner, panel 7 is affixed to panel 2, and panel 8b is affixed to panel 3b. In this condition, the panel 4 will lie against panel 2, and panel 5b will lie against panel 3b. The front tie member 14 is then swung back so as to lie flat against the panel 2, when the blank 1 is in preferred position for shipment.

To set up the casing, the rear panels 4, 5a and 5b are first folded back so that they extend outwardly from the rear end of the blank on the score lines 10', 30'a and 30'b respectively. These panels thus assume a position relative to the panels 2, 3a and 3b similar to that shown for panel 4 in Figure 3. The body of the casing is then folded on the score lines 33a, 9a, 9b and 33b so that the panels 6a, 2 and 6b are perpendicular to the panels 3a and 3b as is shown in Figure 2. The tie member 14 is then rotated on its axis until it lies flush against the front edge of the casing in which position it substantially faces the entire front edge of the blank and its projections 13a and 13b cooperate with the extensions 24 of the channel members 11a and 11b. It will be noted in Figure 4 that the front edge of the extension 24 is so shaped as to allow easy entrance of the portions 13a and 13b; and that after the entrance of these parts within the extension 24, the two parts are firmly held to each other by the shape and elasticity of extension 24. The front reinforcing members 26a and 26b are then bent back upon their score line, which completes the assembly of the front end of the casing. The angle wire 14 aided by the reinforcing members 22, 26a and 26b prevents angular movement of the top panel 2 relative to the side panels 3a and 3b at the front end of the casing and at the same time these members permit the front end of the casing to carry a heavy vertical load without buckling. The bottom extensions 6a and 6b of the side walls are also maintained in proper angular relationship by means of the angle wire 14. In this case the wire cooperates with the extension 24 of the members 11a and 11b and with the side reinforcing members 26a and 26b to maintain proper angularity. At the same time, the bottom ends of the rabbets 29 on members 26a and 26b contact the face of the members 11a and 11b, which not only assists in preventing the flaps 6a and 6b from being turned inwardly, but also provides a support for carrying vertically any load that may be imposed upon the members 26a and 26b.

After the front end has been folded into place, the flaps 5a and 5b are folded down so as to be perpendicular to the panels 2, 3a and 3b as well as to the flaps 6a and 6b. The panel 5a is clearly shown in this position in Figure 3. When these panels are brought down into this position, the pin 12a enters one of the holes 18 on member 15a, and the pin 12b enters one of the holes 18 on the member 15b. Panel 4 is then swung down being pivoted on the bend line 10', until it lies flush upon and on the outside of panels 5a and 5b as shown in Figure 5. In this position, the cut out portions 21 will fit around the pins 12a and 12b. Members 15a and 15b are then bent on their score lines 17, at which time the second of the holes 18 in member 15a will coact with the pin 12a and the second of the holes 18 in member 15b will coact with the pin 12b. The back member comprising the panels 4, 5a and 5b, is thus firmly held in place within the casing shell. This back member being of double thickness and being inset within the casing walls forms a rigid support for the rear end of the casing, so that the rear end will retain its proper angular relationship and will support a load of considerable magnitude. Moreover, the bottom flaps 6a and 6b are firmly secured to the rear wall by the pins 12a and 12b projecting through the holes 18 in the metal strips 15a and 15b.

Both the front and rear end of the casing are thus secured against collapse after the casing has been set up for use, even though the casing may be readily shipped in a collapsed condition. The casing may be used as a single casing as shown in Figure 2. Such a casing may be set on the floor or on a desk or table, or it may be used with a special base section; and a drawer may be readily inserted or withdrawn from the casing.

Moreover, casings of my novel construction may readily be used in stacks of two or more casings, preferably with a base section of similar construction. Individual casings of such a stack may be readily interlocked with each other and the bottom casing of such a stack may be readily interlocked with the base section. Moreover, adjacent stacks may be readily interlocked with each other.

Figures 7 and 8 show a stack of two casings mounted on a base section. As shown, the base section is of a construction similar to the casing sections except that the height of the base section is less than that of the casing sections. Thus, as shown, the side wall members 32a and 32b of the base section are of less height than the side wall members 3a and 3b of the casing sections. Also, as shown, the projections 13a and 13b of the tie member 14 are extended to form a continuous member 33 across the base section. Between this tie member 33 of the base section and the top reinforcing member 22 of the base section, there may be inserted the panel 34 to give a finished appearance to the base section.

The slots 19 in the members 15a and 15b at the rear end of the casing are provided to receive the hook shaped metal member 35, shown in detail in Figure 12a. As will be clearly seen in the sectional view shown in Figure 9, the shank 36 of the hook 35 is inserted into the slots 19 until the end of the shank rests against the outstanding rabbet 20 which forms a stop to provide for proper positioning of the hook. The lower strap 37 forming one of the slots 19 may also be used as a stop by coacting with the top portion of the hook 35. To interlock the rear end of the casing with a subjacent casing, it is necessary merely to place the hooks 35 of the superposed section over the flange formed by the panel 7 and a portion of the top panel 2 of the subjacent section. The slots 19 may be placed at any location along the members 15a and 15b. If the slots 19 are placed adjacent to the wall members 3a and 3b, the hooks 35 may be made slightly wider than the shank portion 36. One side of the hook in member 15a will then contact the flange formed by the panel 8a; and one side of the hook in member 15b will contact the flange formed by the panel 8b. In this way, the hooks will prevent lateral movement as well as longitudinal movement of the superposed casing relative to the subjacent casing. In this, moreover, the two casings (or the bottom casing and the base section) will be firmly secured to each other at their rear ends; and this method of interlocking may be applied without reaching behind the stack of casings.

The front end of the casings is provided with the slots 28 adapted to coact with the interlocking strap 38. This strap and its method of application is similar to interlocking means disclosed in my copending application S. N. 693,841, filed Oct. 16, 1933. It is shown in detail in Figure 11. It comprises the shanks 39a and 39b of a size to snugly enter the slots 28 and a somewhat wider middle portion 40 provided with the hook 41. The middle portion 40 is bent out of the plane of the shanks 39a and 39b on the lines 42a and 42b so that the middle portion 40 lies in a plane standing out from the plane of the shank portions and parallel therewith. This forms a small flange at the lines 42a and 42b, which act to properly position the member 38 with respect to both the superposed and subjacent section when the shank 39b is inserted into the slots 28 at the top of the subjacent section and the shank 39a is inserted into the slots 28 at the bottom of the superposed section, as shown in Figures 7 and 8. When the interlocking member 38 is inserted in the manner just described, it will firmly hold the front end of the two casings together. As described above, the hook 41 will be pointing upward. However, the interlocking member will operate with equal facility to bind together a stack of casings if its position is reversed, that is, if the shank 39a is inserted into the upper slots of the lower casing and the shank 39b is inserted into the lower slots of the upper casing. In this position the hook 41 will point downward. Whether the interlock member 38 is placed so that the hook is pointing up or down the hook will be outstanding from the casing. This condition, I utilize to interlock adjacent casings. Thus, the hooks may be inserted in a manner to point upward on one side of the casings and to point downward on the other side of the casings. The hook 41 on the interlock of one casing will then enter the slot 43 of the interlock or its adjacent casing, each of the hooks clasping the intermediate portion 40 of its mating interlock, which I have pressed out of the plane of the shank portions 39a and 39b a sufficient distance to allow space for the hook of the mating interlock between the casing and the portion 40.

In applying the interlocks to two casings of a stack, I prefer that the back interlocks be first inserted in the slots of the upper casing, that the front interlocks be then inserted in the upper slots of the lower casing. The back interlocks may then be hooked around the flange at the back of the top of the lower casing. The front upper end casing may then be swung down, using the rear interlock hooks as pivots and the upstanding interlocks on the front of the lower casing will enter the slots on the bottom of the front end of the upper casing. Where stacks are to be interlocked with each other, the first erected stack should have the prongs 41' of the front interlocks pointing upward and the later erected stack should have the prongs adjacent to the first stack pointing downwardly. In this manner, the downward projecting prong 41 will interlock the first stack when the casings of the second stack are swung downward on the rear interlocking hooks as has just been described.

In Figure 10, I have shown the manner in which the cups 23 formed in the upper front reinforcing members may be used as a stop to prevent accidental withdrawal of the drawer to be used in the casing. In this figure, a portion of the drawer is shown in section at 47. This drawer has the bottom panel 48 and the rear panel 49. To the latter is attached the strap 44 by any suitable means, as for instance, by the prongs 46. The strap 44 is provided with the short hook portion 45 extending slightly below the drawer bottom 48. When the drawer is withdrawn to the end of its normal forward travel, the hook 45 mounted on the rear of the drawer engages the cup 23 mounted on the front of the casing. While the hook portion 45 is shown as extended downward in a straight line from the rear of the drawer, it will readily be seen that it may be bent forward or backward so that the hook portion 45 will contact the cup 23 with the drawer at any desired distance within the casing. Moreover, the strip 44 carrying the hook 45 may be provided with a right angle bent so that it may be attached as a cleat to the bottom of the drawer. Furthermore, while the edge of the cup 23 is shown as coinciding with the edge of the member 22 to which it is attached, it will be readily understood that the material of the cup may be so formed that the edge of the cup may be either forward or backward of the edge of the member 22. In this way, the position of the drawer in the casing at which the stops actuate, may be further predetermined.

In Figures 15 to 21 inclusive, I show a modified form of my invention. The blank 60 for this modified form of casing is shown in Figure 15 and is substantially the same as the blank 1 of Figure 1, and differs therefrom mainly in the addition of the extra flap 61a attached to the flap 5a, the flap 61b attached to the flap 5b, and in the particular form of the reinforcing track and interlocking members attached to the blank. The extra flap shown in Figure 15 provides a rear wall member having a triple thickness of wall material. Such a rear wall member might readily be provided on the blank of Figure 1 by modifications which will be apparent to one skilled in the art. Moreover, it will be apparent that certain of the fittings shown on Figure 1 and not shown on Figure 15 may be used with the later construction; and conversely certain parts of the construction shown for Figure 15 may be used in connection with Figure 1. Inasmuch as the blank of Figure 15 is the same as Figure 1 except for the added flaps, those parts which are substantially identical in construction on the two figures have been characterized in the same designation.

In Figure 15, the flap 5a is provided with the pin 62a held in place by the clip 63a attached to the blank in any suitable manner as for instance, by the prongs 64. Similarly, the pin 62b is attached to the flap 5b.

The metallic member 66 having the bending line 67 is attached to the panel 4 by means of the prongs 68. At points along the bending line the metal is punched out to form the hole 65a located to coact with pin 62a, and the hole 65b located to coact with pin 62b when the casing is folded into position.

Located on the far side of the blank as viewed in Figure 15 are the track members 67 secured to the side wall 3a and 3b by means of the prongs 68. Panels 3a and 3b also are provided with the front reinforcing members 26a and 26b similar to those described in connection with Figure 1; and with the interlocking members 69a and 69b which will be described more in detail later.

The flaps 6a and 6b are provided respectively with the channel members 70a and 70b. The rear end of each of these channels is provided with the holes 71 extending through the flaps. These holes 71 are so placed as to coact with the pins 62a and 62b when the blank is folded into a casing. Also at the rear end of the members 70a and 70b and preferably formed as an integral portion thereof are the hooks 72 which may be of the same general form as the hooks 35 of Figure 10 as have been described. Hooks 72 formed as a part of the members 70a and 70b are provided to function in the same manner as are the separate hooks 35 as have previously been described. At the front end of each of the channels 70a and 70b is the extended portion 75 united with the upper flange by means of the bending line 74. On the lower flange of each of the channel members and preferably formed as an integral part thereof is the cup shaped member 73 similar in form to the member 23 described in connection with Figure 1.

The top panel 2 is provided with the holes 76 so spaced as to be in vertical alignment with the pins 62a and 62b when the blank is folded into a casing. At the front end of the top member is the horizontal reinforcing member 22 in which is held the tie member 14 in a manner similar to that described in connection with Figure 1. Tie wire 14 is in this case provided with the two semi-circular loops 77 on the upper bar of the member and the top channel 22 is provided with the cut away portions 79 within which lie the loops 77. The extensions 13a and 13b of the member 14 are provided with the further extensions 78, the center lines of which lie in the same vertical lines as do the centers of the semi-circular loops 77, as is clearly shown in Figure 19.

The casing may be prepared for shipment in substantially the same manner as has been described in connection with Figure 1. However, unless the tracks 67 are omitted, the flaps 5a and 5b must be extended outwardly from the line which will be assumed by the creases 30'a and 30'b when the blank is folded back on the creases 30a and 30b. The flaps 61a and 61b may be folded back under the flaps 5a and 5b respectively and the back flap 4 may be folded back under the top panel 2 in the same manner as has been described in connection with Figure 1. The tie wire 14 must be folded under the blank, as the loop 77 will prevent its lying flat on the top panel if folded on top of the blank.

In erecting the casing from the blank, the rear panels are first bent backward so as not to interfere with the folding of the casing on the score lines 33a, 9a, 9b and 33b. The casing is then folded on the above named score lines so that the flap 6a and 6b are in the same plane as each other and so that these flaps and the top member 2 are perpendicular to the side walls 3a and 3b. The tie member 14 is then placed against the front edge of the wall members and the vertical reinforcement 26a and 26b are bent around the main vertical portions of the wire 14 and the extensions 75 of the channels 70a and 70b are bent down around the extensions 13a and 13b. In this manner the front end of the casing is securely held against displacement.

In erecting the rear end, the flap 61a is folded into face to face relationship with flap 5a; and flap 61b is similarly folded into relationship with flap 5b. Each of these double flaps is then folded back so as to be perpendicular to the walls 3a and 3b, the top panel 2, and the flaps 6a and 6b. On folding the flaps back in this position, the pins 62a and 62b engage the holes 71 in the flaps 6a and 6b. Rear panel 4 is then folded down into face to face relationship with panels 5a and 5b; and the strip 66 is folded by on the bend line 66. In this folding operation, pins 62a and 62b enter the holes 65a and 65b in the strip 66; and the overhanging portion of strip 66 clamps over the panels 5a, 5b, 61a and 61b, which firmly binds the rear panels into an integrated structure.

The casing is thus completed and may be used with a base section similar to that previously described. The modified casings produced from the blank of Figure 15 may be used in stacks as shown in Figures 16 and 17, and when the casings are so stacked they interlock with each other in the following manner.

The hooks 72 formed on the rear end of the channel members 70a and 70b of the superposed section are engaged with the flange on the rear top of the subjacent section formed by the panel 7 and a portion of the top panel 2. The forward end of the superposed section is then swung downward with the hooks 72 as hinges. This movement will bring the pins 62a and 62b which project through the bottom of the rear wall of the superposed section into engagement with the holes 76 in the top of the subjacent section. Also the extension 78 of the tie member 14 which project below the bottom of the superposed casing will enter the space between the semi-circular loop 77 and the cutout portion 79 on the subjacent section, as is clarly shown in Figure 20. At the same time, the interlocking pieces 69a and 69b are brought into position.

These interlocking members which are attached to the casing by any suitable means, such as the prongs 80, are bent away from the casing for a short distance as shown in Figures 16 and 17, and have a downwardly projecting lug 81 extending below the bottom of the casing. This downwardly projecting lug is bent back into the plane of the side walls of the casing so that the lugs 81 on the interlocking members of the superposed casing grips the side walls of the subjacent casing.

It will be noted that the lugs 69a as shown on the left hand side when facing a stack of casings are open at the front end; and that the lugs 69b on the right hand side of the casing are open toward the rear end. Thus, if a stack of casings are erected and a second stack pushed back along the left hand side of the first stack, the interlocking members 69b of the second stack will engage the interlocking members 69a of the first stack, as shown more clearly in Figure 21. In this manner, adjacent casings may be locked together.

The cup like member 73 on the channel members 70a and 70b are for the same purpose and operate in the same manner as described for the cup like members 23 provided on the casing of Figure 1. That is, they cooperate with a member secured to the drawer to prevent excess forward movement of the drawer.

Further modification of my invention is shown in Figures 22, 23 and 24. In these figures the casing is modified particularly in the method of forming the rear end wall as well as in the interlocking means.

In the blank shown in Figure 22, the rear end panel 4 is connected directly to the top panel 2 rather than through the agency of an intermediate panel as has been shown in the previous figures. Also the flaps which have been shown attached to the side walls of the casings of the previous described casings have been omitted in the blank shown in Figure 22.

As will be seen, each of the side panels 3a and 3b are provided along their free edge with members 91 which are attached by any suitable means such as the prongs 98. Members 91 are provided with a hook shaped projection extending beyond the edge of the side panels, as will be more clearly seen from Figure 23.

On the far side of the blank near the free edge of each of the side panels 3a and 3b is a track member 67 for coacting with wheels on a drawer to be inserted within the casing.

On the same side of the blank as the members 91 but at the edge of each of the side panels 3a and 3b adjacent to the bottom panel 2 is a member 92 secured to the casing in any suitable manner. This member is shown as so shaped and so attached to the blank that it is in the shape of an inverted J when the casing is erected. This also may be clearly seen in Figure 23.

Along the rear edge of each of the side panels 3a and 3b, there is shown a U shaped reinforcing member 97. Each of these members is provided with a plurality of slots 96 so spaced as to cooperate with the prongs 94 secured to the edge of the rear panel 4 when the casing is in set up position. As shown in the figure, prongs 94 are formed integral with the U shaped reinforcing members 93, the metal for the prongs being provided from the cut out portions 95 of the reinforcing members. These prongs 94 with their cooperating slots 96 may be any one of the forms of bayonet slot construction shown in my co-pending application entitled Container fastening means, and filed coincidentally with this application.

The front of the casing blank of Figure 22 is substantially the same as those previously discussed and will not now be further described.

In setting up the casing from the blank, to assemble the rear end, it is merely necessary first to fold down the back panel on bend line 10 until it is perpendicular to panels 2, 3a and 3b. Then panels 3a and 3b are folded down on bend lines 9a and 9b, when the prongs 94 enter the slots 96 which anchors the rear end of each of the side walls 3a and 3b to the rear wall 2, in the manner fully described in my copending application which was referred to in the preceding paragraph.

The front end of the casing may be secured in a manner similar to that described for the other casings.

In Figure 23 I have shown a portion of a casing made from the blank of Figure 22 superposed upon a similar casing. As may be seen, the hook shape member 91 of the superposed casing hooks over the inverted J shaped member secured to the top of the subjacent section. This securely interlocks the two sections substantially along the entire length of the bottom of the upper casing and the top of the lower casing. The bottom of the upper casing is thus effectively prevented from either spreading or bowing at all points along its length.

In Figure 23 I have shown a portion of a drawer in place in the upper casing section. The drawer section is shown at its extreme forward position in the casing. In order to prevent complete removal of the drawer from the casing, the rear end of the drawer is provided with the slot 101 through which projects the bar 99. When the drawer is withdrawn to its extreme forward position, the portion of the bar projecting to the outside of the drawer through the slot 101 makes contact with the rabbet 29 on the front vertical reinforcing member 26b of the casing as is clearly shown in Figure 24. While I have shown this construction on only one side of the drawer, it will of course be clear that I may place a similar stop on either or both sides of the drawer.

The bar 99 is shown attached to the drawer by the pivot member 100. When the drawer is first inserted into the casing, the bar member 99 is entirely within the drawer; but after the rear end of the drawer has been inserted an amount to be back of the rabbets 29, the bar 99 may be swung on pivot 100 so that its end projects through the slot 101. Other means that a pivot may be used so that the bar may be entirely inside of the drawer when the drawer is first inserted in the casing and may later be moved to a position part way out of the drawer. Thus, the bar may be provided with a slot over the rivet 100 so that the bar may be slid in or out through the slot 101, the bar being moved in a plane parallel to the rear wall of the drawer.

In Figures 25 to 30, I have shown a further modification of the rear end construction and interlocking means. In this modification, the rear wall is shown as an entirely separate panel which may be united with the side and top wall panels when the casing is set up for use. Thus, Figure 25 shows the rear end of a casing in position to receive the rear end panel shown in Figure 26, and Figure 27 shows a cross section of the rear end panel of Figure 26 after it has been inserted in the casing of Figure 25.

Referring to Figure 25, the top panel 2 is provided with the U shaped reinforcing member 101 along its rear edge. This member is provided with the two holes 102. Each of the bottom flaps 6a and 6b is provided with the U shaped members 11a and 11b respectively, each of which is provided with the hole 103 in vertical alignment with the holes 102 when the casing is in set up position. Along the rear edge of each of the side walls is a reinforcing member 104 provided with the slots 96, similar to those which have been just described in connection with Figure 22. Holes 102 extend through the top panel 2; and holes 103 extend through the bottom flaps 6a and 6b. The slots 96 are preferably formed in a grooved shaped portion on the inside of the channel section.

Along each edge of the rear panel 4 is a reinforcing member 105. Reinforcing members 105 are provided with the prongs or bayonets 94 which are positioned to cooperate with the slots 96 on the channel member 104. Also, preferably as an integral portion of the members 105 are the hollow cylinders 106 so positioned on the rear panel 4 that their center line will be in vertical alignment with holes 102 and 103 when rear panel is in position in the casing.

To assemble the rear end of the casing, it is folded down around the panel 4, the edges of which lie in the grooves on the members 104 of the casing. This operation brings the bayonets secured to the rear panel into operative relationship with the slots secured to the side walls of the casing. In this manner the back panel is firmly united with the side walls.

The bottom flaps 6a and 6b are then folded up against the rear panel and a pin 107 is inserted through each of the holes 102, the pin projecting through the hollow cylinder 106, the hole 103 and extending slightly below the bottom of the flap 6a or 6b as the case may be.

Pin 107 which is shown in greater detail in the sectional Figure 29, comprises the shank 107 with the enlarged head 108 containing a hole 109. Hole 109 is in line with the shank 107 and is of somewhat larger diameter.

When pin 107 is inserted into the hole 102, 106 and 103 as just described, it will enter the holes until the head 108 comes to a seat on the top of cylinder 106. In this position the top of the head 108 is preferably flush with the top of top panel 2 of the casing. The shank 107 is preferably a fairly snug fit in the holes 103 of the bottom flap. The pins thus aid in securing the back panel to the casing structure and at the same time prevent the bottom of the casing from spreading.

When a casing of this construction is superposed on a similar casing as is shown in Figure 28, the extensions of the shank 107 which protrude below the bottom flaps 6a and 6b enter the holes 109 in the pins of the subjacent casing.

Adjacent casing may be interlocked by means of the members 110 having the holes 111 through which the shank 107 may be passed. Holes 111 are so spaced that the distance between them is equal to the distance between adjacent pins 107 on two casings when the casings are placed in contact with each other. Thus bar 110 may be placed between the bottom flap of one casing and the top of a subjacent casing with the pin 107 of the upper casing passing through one of the holes 111, as shown in Figures 27 and 28. The bar 110 may be maintained in a position back of the casing until it is desired to build an adjacent stack, when it may be swung around so that its free end may be locked into the second stack using the pin 107 of the new stack as the locking means. Any number of adjacent stacks may be locked together in this manner.

Instead of having loose pins as shown in the figures just described, by slight modification the pins may be fixed in the end panel. Such a modification is shown in Figures 31, 32 and 33.

In Figure 31 there is shown a rear end of a casing in position to receive the back panel shown in Fig. 32. The top panel 2 of the casing has at its rear edge the channel shaped reinforcing member 101. This member is provided at each end with the two holes 124 and 125 which extend through the top panel 2 and both flanges of the channel 101. The side panels 3a and 3b have at their rear end the reinforcing channels 104 which may be in every way similar to side wall reinforcing members described in connection with Figure 25. Each of the channel members 11a and 11b on the bottom flaps 6a and 6b respectively are provided with the hole 127 which is in vertical alignment with a hole 124 in the top panel when the casing is set up in position. Holes 127 extend through bottom flaps and both legs of the reinforcing channels. The rear end of the bottom flap is cut away on a smooth curve 129 as shown more clearly in Figure 33. This curve 129 terminates at the end adjacent to the side wall in the notch 128, which is in substantial vertical alignment with the holes 125 in the top panel.

The rear panel shown in Figure 32 differs from the rear panel of Figure 26 in that the cylindrical portion 106 of each of the edge reinforcing members 105 is cut away at 123 to form a locking means for positioning the pins 121 which are carried by the back panel instead of as separable members. These pins 121 are bent at the bottom so that the extension 126 is parallel to the main portion of the pin 121, and so that the center line of the extension 126 is displaced from the center line of the main portion of the pin by the distance between hole 124 and hole 125 in the top panel of the casing. The pins 121 extend above the panel 4 by substantially the distance through the top panel 2 and the bottom flap 6a or 6b. At the slot 123 in the cylindrical member 106, the pin 121 is bent out to form a curve 123. This curve as shown is in a plane extending toward the casing about 45° from the plane which includes the center line of the pin 121 and the extensions 126. Extension 126 is of sufficient length to extend through the bottom flaps and the top panel.

In assembling the rear panel within the casing, the pins 121 are first inserted into the holes 124 in the top of the casing, the extensions 126 being turned so as to be substantially directly behind the line of the pins. The side walls are then folded in, when the prongs 94 on the rear panel member enters the slots 96 on the casing member and lock the rear panel to the casing. The end 126 of the pin 121 is then rotated outwardly along the curve 129 at the rear end of the bottom flap. As the extension 126 is moved along the curve, it is somewhat deformed out of shape due to the shape of the curve which increases in distance from the center 121 as the pin is rotated. This deformation puts a strain in the pin which causes it to snap into the slot 128 when the pin has been rotated 90°. This locks the flaps 6a and 6b to the rear panel and holds their rear end in proper position.

When one casing is placed upon a similar casing, the pins 121 extending through the holes 124 in the top wall of the lower casing enter the holes 127 in the bottom flaps of the upper casing and the extensions 126 extending down through the slots 128 in the flaps of the upper casing enter the holes 125 in the top panel of the lower casing; in this manner the superposed sections may be interlocked.

A further form of back wall member is shown in Figure 36. This form of back wall may be used with the form of rear end shown either in Figure 34 or Figure 36. In both of these figures, the rear end has vertical edge reinforcements 26 similar to the front edge vertical reinforcements as have been described.

The back wall member 130 of Figure 36 has the back panel 131, the U shaped bottom edge reinforcement 133, 134, the U shaped top reinforcement 135, 136, and the side reinforcements 132a and 132b bent perpendicular to the panel 131. The entire back wall member may be formed of sheet metal; or if desired, only the top and bottom reinforcing members may be of sheet metal, the remainder of the back wall member being made of suitable fibrous sheet material to which the reinforcing members are secured in any suitable manner.

In erecting a casing as is shown in Figure 34, with the back panel as shown in Figure 36, after folding the casing into the position as shown in Figure 34, the back panel is inserted into the open rear end of the casing. The bottom U on the rear wall envelopes the ends of the bottom extensions 6a and 6b on the casing, the wall 133 of the U fitting below the extensions, the distance between walls 133 and 134 being such that the extensions 6a and 6b fit snugly between the two walls 133 and 134. The side member 132b of the rear end member fits snugly against the side wall 3b of the casing, and similarly member 131a fits snugly against side wall 3a. The top reinforcing U of the rear end member fits around the rear edge of the top panel 2 of the casing, with the wall 136 of the U fitting closely against the inside of the top wall 2. The spacing between 135 and 136 is such that the member 135 stands some distance above the top of the top panel 2. This permits the channel 133 of a superposed casing to be disposed in channel 135—136 between the top wall 2 of the casing and the top wall 135 of the channel. The flange of lip 137 shown on the edge of the wall 135 is preferably omitted in the construction as just described. Members 26 are folding back on their score lines after the rear end member has been inserted into the rear end of the casing as has just been described.

For use with the rear end construction shown in Figure 35, the flange 137 is preferably provided as shown. For this construction, the distance between walls 133 and 134 is such that the bottom U shaped member fits snugly over the wire 14, while the distance between walls 135 and 136 is such that the top U shaped member on the back wall fits snugly over the top horizontal reinforcing member 22 at the rear end of the casing top wall 2. The length of the member 135 is preferably such that the flange 137 at the edge of the members will snap behind the edge 138 of the member 22, in a manner as described in my copending application entitled Reentrant clip and filed coincidentally with this application.

It will be noted that the construction shown in Figure 35 as a rear end is substantially the same as that shown for the front end in Figures 1 to 24. In Figure 35, the angle members 14 at each of the four corners are shown as being united with each other to form a loop. This construction may be used as well for the open front end of the casing.

Where the back panel 130 is used with a rear construction as shown in Figure 35, it is inserted into the casings with the U 133 and 134 enveloping the rod 14, the U 135—136 enveloping the channel 22 with the loop 137 locked back of the edge 138 of channel 22 and the walls 132a and 132b fitting snugly against the inside of wall 3a and 3b respectively. This is done prior to folding back side reinforcements 26 on their score lines. The folding back of members 26 securely fastens the rear panel in the casing.

It will be noted that the construction shown in Figure 35 with the corner angles united into a single loop produces a very rigid structure even when the casing is used by itself and is not stacked with other similar casings. This loop construction prevents buckling in or spreading out of the side walls 3a and 3b even without the use of an interlocked rear end member.

Thus, the construction shown in Figure 35 is used, it is not necessary to provide an end closure member for rigidity, as ample rigidity is provided by the looped corner wires. Thus the rear panel may be entirely omitted. In this case I prefer to use a drawer with a full height back wall. Such a back wall abutting against the rabbets 29 on each side of the back end will effectively close the rear end of the casing when the drawer is inserted its full distance into the casing.

Instead of relying upon the drawer end for closing the rear of the casing, when the rear end is constructed as shown in Figure 35, a plug panel 141 as shown in Figure 37 may be pushed into the end of the casing. This plug panel may be one of the type which I disclose in my copending application entitled Panels and filed coincidentally with this application. As shown in Figure 37 this panel has reinforced edges. In inserting this plug panel into the casing end face 142 fits against the inside of the wall 3b, edge 143 fits against the inside of the wall 3a and wall 145 fits against the bottom portion of the wire loop 14. Faces 146 and 147 fit against the rabbets 29.

While I have described the use of a base section in connection with a single casing or a stack of casings, the casing may be placed on the floor directly or I may use foot members instead of a base section to lift the lower casing off of the floor. Such a foot member is shown in Figure 38. This foot member I preferably form from a formed blank of metal. The metal blank is folded to form the sides 15' having the flanges 152. These sides and flanges together with the main panel 150 form a box like structure which may be inserted under the casing for supporting same. One of such feet is used at each corner of the casing. The tongue 153 is inserted into the straps 28 at bottom end of the vertical edge reinforcement such as are shown in Figure 35. The vertical portion 154 extending above the box-like part of the foot member and connecting with the tongue 153 is somewhat wider than the tongue, is of such width that when the tongue is inserted into the strap 28 and when the casing is resting on the upper edge of the box section of the foot, the upper edge of the wide section 154 will abut the lower edge of the lower one of the straps 28.

In Figures 39 to 43 inclusive, I have shown a number of sections in which the top has been modified in such a manner that the top is inset between the side walls in a manner similar to that shown for the back panel shown in Figure 3. Thus referring to Figure 39, the top panel 2 has the side flanges 160a and 160b which are folded so as to lie flat against the side walls 3a and 3b respectively. In this position, the flange and the top of the side wall are secured to each other by any suitable means such as the metallic channel 161. This construction is shown in all of the Figures 39 to 43 inclusive. In Figures 42 and 43 channel 161 has the trough shaped extension 162. The side walls may be formed from the same sheet of material as the top panel and the flanges as shown in Figure 39 or the top panel and flanges may be made of a separate sheet from the side walls as shown in Figure 41. This joint is of a folding or collapsible type as is shown in my copending application entitled Clips and filed coincidentally with this application.

As is indicated in Figures 39 to 43 inclusive, the flange formed on the top of the casing may be used for interlocking superposed casings. Thus in Figure 39 there is shown the members 163 attached to the bottom of each of the side walls of the casing. These members 164 have a section shaped in an ogee curve so that when the upper casing is placed over the lower casing, the side walls 3a and 3b of the upper casing rest upon the members 161 of the lower casing and the outstanding portions 164 of the members 163 of the upper casing fit snugly between the members 161 of the lower casing. In Figure 40 substantially the same coaction between casings is obtained. However, the member 163 is provided with a flange 165 extending at right angles from the extremity of the outstanding portion 164. This flange 165 rests upon the top panel 2 of the subjacent casing and may serve as a track for a wheel or roller for supporting the drawer to be inserted into the casing. In Figure 41, the bottom of the side walls 3a and 3b have attached thereto the member 166 having the shape of an inverted U and provided with the extension 167 for attachment to the side walls. Each of the U portions fits snugly over its corresponding mating member 161. In Figure 42, the members 163 are attached at the bottom of the side walls on the outside of the walls instead of on the inside of the walls as shown in Figure 39. The extensions 164 of the members 163 thus cooperate with the troughs 162 provided for that purpose on the channels 161. In the construction shown in Figure 43, the upper portions of the side walls 3a and 3b are bent inwardly a sufficient distance that the troughs 162 are in vertical alignment with the side walls. Thus the members 163 shown attached to the outside of the side walls in Figure 42 may be omitted in the modified form shown in Figure 43, as in this latter figure the bottom edges of the side walls 3a and 3b of the upper casing may be inserted directly into the troughs 162 on the members 161 of the lower casing. In Figure 43, there is also shown flange portions 165 attached to the inner edge of the members 161. These flanges are similar to those described in connection with Figure 40.

It will be understood that except where the member attached to the bottom of the side walls is to function also as a track member, it may be composed of a plurality of short sections attached to each wall of the casing rather than a single piece on each wall, substantially continuous with the wall to which it is attached. That is either a single piece or a plurality of pieces may be used on each wall according to the particular application.

It will further be noted that the flange arrangement on the top of the side walls is not a disadvantage in contributing useless height to a stack of casings as it would be if each casing had both a top and bottom panel. It will readily be seen that when the casings are stacked vertically, the space between the flanges of the lower casing is added to the space provided between the top and side walls of the upper casing; and a drawer constructed to operate in the casing may be of a size to utilize the combined space so provided.

In Figures 39 to 43 inclusive, the flange portions 160a and 160b were shown as coterminous with the top of the side walls 3a and 3b. The top panel 2 with its flanges 160a and 160b could thus be integral with the side walls or could be a separate piece therefrom according to the particular application. Where the top panel 2 with the flanges 160a and 160b is a separate sheet from the side walls, the top of the flanges may be placed either above the top of the side walls as is shown in Figure 44 or below the top of the side walls as is shown in Figure 45. In these two figures, the top panel 2 with its integral flanges 160a and 160b is shown as being attached to the side walls 3a and 3b by the stitching 168.

In Figure 44, the flat plates 170 are attached to the lower extremity of the side walls 3a and 3b and protrude beyond the walls. When one casing is superimposed upon a similar casing the lower edges of the side walls 3a and 3b of the upper casing rest upon the upper edges of the side walls 3a and 3b of the lower casing. In this position, the upper portion of the sidewall of the lower casing and the lower portion of the sidewall of the upper casing are positioned between the upturned flange on the top panel 2 of the lower casing and the downwardly extending plate 170 on the bottom of the upper casing. The two casings are thus rigidly positioned with respect to each other.

In Figure 45, the lower edges of the side walls have affixed thereto an additional plate 171, placed on the inside of the casing. The two plates 170 and 171 on each wall of the casing with their depending portions form the slots 172 in which the extended portions 169 on the top of the side walls of the lower casing may be disposed. In this way the bottom edge of the side wall of the top casing will rest upon the top edge of the side wall of the lower casing and the extremities of the two walls will be restricted in movement by the plate 170 and 171. It will, of course, be understood that a track member may be formed on the inner plate 171 as desired.

In the modifications so far discussed, I have shown a casing having a top panel and two side wall panels but with no bottom panel. Any of these constructions may be inverted with slight modifications so as to form a casing having a bottom panel and two side walls but with no top panel. An example of such a modification is shown in Figure 46.

The casing shown in this figure is shown with a rear end panel similar to that of Figures 15, 16 and 17 already described, and the front end is similar to that of Figures 1, 2 and 8, except that the horizontal front edge reinforcement is inverted on the blank and the extensions 13a and 13b of the member 14 are not shown.

Along the exposed upper edge of the side walls of the casing is disposed the reinforcing member 181 which may be provided with the rail 185. As shown, at two points 182 on each of these reinforcing members 181 the metal is slit and turned back to form the upwardly protruding prongs 183. When one casing is superimposed upon another similar casing, these prongs 183 in the lower casing enter similarly disposed slots 184 provided in the bottom panel of the upper casing. While two prongs 183 and slots 184 are shown on each side of the casing, any suitable member may be used. As shown, the front end of the casing is interlocked with the interlock bar 38 and the slots 28 as has been previously described in connection with Figures 7 and 8.

A suitable top panel may be used with the inverted type of casing in the same manner that a base section has been described in connection with the previous figures. Such a top section is illustrated in Figure 47, which shows a top panel to match the particular form of casing shown in Figure 46. This top panel comprises a simple rectangular sheet of material 186 having U-shaped metallic reinforcements 187 attached around its perimeter. Slots 184 are provided to coact with the prongs 183 on the top of the casing and at the locations 189, the side reinforcements 187 are slit and the metal between the slits is turned back to form the prongs 188 which are adapted to enter the upper slots 28 on the vertical front edge reinforcing members 26 of the casing. When the top panel is thus placed over the casing, the prongs 183 of the casing enter the slots 184 of the cover, and the prongs 188 of the cover enter the slots 28 of the casing, which secures the cover to the casing.

I have previously mentioned in this specification that the form of casing which is the basis for the present application is particularly well adapted for securing track members as such members may be placed at the free edge of the blank where they are easily and readily attached. In Figures 48 to 54, I illustrate a number of forms of such tracks attached to the free edge of the casing.

In Figure 48, the free edge 192 of the casing is provided with the Z-shaped track 191. As shown, the casing sheet is then folded back on the score line 193 and stitched as shown at 194. With this arrangement the track may be applied at the free edge of the sheet, but will be positioned at any height desired on the side wall. This same method of applying a track to the free edge of the sheet may be used even when the casing is provided with a flange at the bottom as has been shown, for instance, in Figures 2 and 16. Thus, in Figure 49 the flange 195 may be formed from the construction of Figure 48 by incorporating a bending line 203 and folding the sheet along this line.

Figure 51:
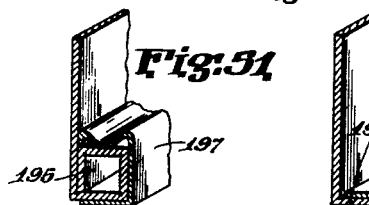

In Figures 50 and 51, I have shown a box like structure at the free edge of the sheet. This box structure is maintained in position by a channel shaped metallic reinforcing member. In Figure 50, this member 196 is shaped in a manner to provide a flat track on the top of the box member 195; and in Figure 51, the reinforcing member 197 is shaped to provide a grooved track on top of the box member 195.

Figure 53:
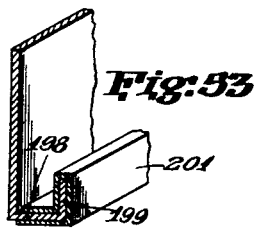
Figure 52:
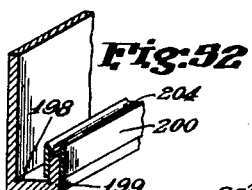

In Figures 52 and 53, the edge of the side wall is provided with an L-shaped flange 199 carrying a track. In Figure 51, this track 200 is a simple channel member having a groove 204 for carrying a wheel on the drawer. In Figure 52, the track 201 is an L-shaped member surrounding the flange 199.

Figure 54:
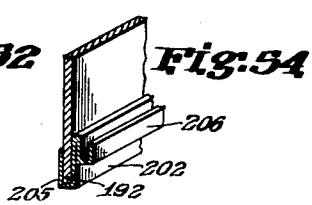

In Figure 54, the track member is a double channel formed as an integral structure. One channel 205 conforms to the sheet material of the casing and is placed over the free edge 192 of the side wall. The other channel 206 may be used for supporting a drawer.

In my construction, I may use corrugated board as the sheet material forming the body of the casing. Such corrugated board may have a considerable curvature in the blank sheet, which has heretofore been a source of annoyance as it has interfered with the construction of the casing. I have found that I may utilize the curvature to the board in a manner to aid in the construction. Thus if I arrange the blank of the casing and the fittings thereon in such a manner that when viewed from the inside, the top wall would be convex from side to side and the side walls would be convex from top to bottom before the various parts are locked together by my various reinforcing and combining means, then after the casing has been fully set up and the parts locked together and reinforced, the curvature of the sheet will be removed due to the stress imposed upon the sheet by the various reinforcing members. This strain so set up in the sheet will act to force the sheet material into closer contact with the reinforcing members and locking members than would be the case if no such strain were present. In this manner, the original curvature of the sheet is removed from the final structure and a strain is set up which instead of being detrimental to the structure, acts to more firmly hold it in position.

It will be understood, of course, that I do not depend upon this strain set up from curvature of the sheet as my structure is well united into a rigid entity when made from flat corrugated board or other material.

It will be understood that the examples described have been shown by way of illustration only and that many changes may be made in my invention without departing from the scope and intent thereof.

Now having described my invention, so that it may be readily understood by one skilled in the art, I claim:

1. A blank for a collapsible casing for a drawer adapted to be mounted in stacks comprising a sheet of non-metallic material; score lines provided in said non-metallic material for predetermining bending lines about which said material is bent to form a casing; said blank having two side wall sections and a top wall section; a track member secured to said side wall sections; metallic reinforcing members having prongs for securing said metallic reinforcing members to the free edges of said side wall sections and having a predetermined bend line about which said metallic reinforcing members may be bent; a rear wall section extending from said top wall section; a blank section extending from the rear end of each of said side wall sections; and metallic reinforcing members secured to one of the edges of each of said blank sections, said reinforcing members having a predetermined bend line for engaging the free edges of said rear wall section to secure said blank sections thereto; an opening in said blank reinforcing members; and a pin protruding from said track member and adapted to be engaged by said openings for securing said side wall sections to said rear wall section.

2. A collapsible casing for a drawer adapted to be mounted in stacks comprising a sheet of non-metallic material; score lines provided in said non-metallic material for predetermining bending lines about which said material is bent to form said casing; said casing having two side wall sections and a top wall section; a track member secured to said side wall section; means for interlocking adjacent casings, the top wall for one of said casings acting as the bottom wall for the next adjoining casing; said top wall section having a reinforcing member and a tab extending therefrom forming a drawer stop.

3. A stack of casings, each of said casings being collapsible and made of non-metallic material;

score lines formed in said material for predetermining a bending line to form said casing from a flat blank; each of said casings having top and side walls; the top wall of each of said casings acting as the bottom wall of the next casing thereabove; means for maintaining said casings in assembled position after they have been turned about said predetermined bending lines; said means comprising metallic reinforcing members secured to said blank; metallic members extending from one of said reinforcing members to the next adjacent reinforcing member to maintain adjacent walls in predetermined angular relation; and means along the lower edges of said side walls of each of said casings for connecting said casing with the top of the casing below and for interlocking and interbracing said connected casings.

4. A blank for a collapsible casing for a drawer comprising a top wall section, side wall sections, a flap extension on each side wall for forming a bottom ledge, a flap extension on each side wall for forming a backwall, said sections and flap extensions being integral with each other and being defined by score lines along which said blank is manually foldable; metallic reinforcement on said flap extensions, said reinforcements on the flap extensions forming the bottom ledge having means for interlocking with the reinforcements on the flap extensions for forming a backwall to hold said flap extensions forming a bottom ledge in proper angular relation to said side walls when said blank is folded into erected position.

5. A blank for a collapsible casing for a drawer comprising a top wall section, side wall sections, a flap extension on each side wall for forming a bottom ledge, said sections and flap extensions being integral with each other and being defined by score lines along which said blank is manually foldable; a metallic reinforcement secured to the open front edge of each side wall; a metallic reinforcement secured to the open front edge of said top wall; a metallic member rotatably mounted in said metallic reinforcement secured to said top wall; metallic engaging means at the front edge of said flap extensions adapted to receive a portion of said rotatable metallic member; and means for locking said rotatable member and said engaging means to each other when said blank is folded into erected position to hold said flap extensions in predetermined angular relation to said side walls.

6. A blank for a collapsible casing for a drawer comprising a top wall section, side wall sections, a rear extension from said top wall section for forming a rear wall; a rear extension from said side wall sections for forming a rear wall reinforcement; said sections and extensions being integral with each other and being defined by score lines along which said blank is manually foldable; a metallic reinforcement secured to said extensions from said side walls; and means on said metallic reinforcements for engaging the bottom edge of the extension from said top wall section to secure the side wall extensions and the top wall extension to each other when said blank is folded into erected position, and to maintain the rear wall, the side walls, and the top wall in predetermined angular relationship to each other.

7. A stack of casings, each collapsible casing being formed from an integral folding blank comprising a top wall member, side wall members, an extension on said top wall member forming a rear wall, an extension from said side wall members forming a double rear wall, and narrow panels forming an inset for the back wall and connecting said extensions to their respective wall members, said wall members, extensions, and panels being defined by score lines along which said blank is manually foldable; a metallic reinforcing member along the bottom edge of the extensions from said side wall members reinforcing the bottom edge of the rear wall; and metallic means attached to said metallic reinforcing member hooking over the rear end of the top panel and its respective narrow panel of the subjacent casing for interlocking superimposed casings.

8. A folding collapsible casing for a drawer adapted to be mounted in stacks comprising a top wall, side walls and an open front end; the top wall for one of said casings acting as the bottom wall for the next adjoining casing; interlocking means for adjoining casings; the front edge of said top wall section having a reinforcing member having means serving as a drawer stop for the adjoining casing.

PHILIP ZALKIND.